United States Patent
Takawane et al.

(10) Patent No.: US 12,019,688 B2
(45) Date of Patent: Jun. 25, 2024

(54) METHOD AND SYSTEM FOR FINDING ONE OR MORE UNIQUE ENTITIES IN DATA

(71) Applicant: Tata Consultancy Services Limited, Mumbai (IN)

(72) Inventors: Adesh Ramdas Takawane, Pune (IN); Nikhil Girish Patwardhan, Pune (IN); Kalaiselvan Kandasamy, Pune (IN); Ashim Roy, Pune (IN); Rupali Kedar Kulkarni, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 18/181,355

(22) Filed: Mar. 9, 2023

(65) Prior Publication Data

US 2023/0306062 A1    Sep. 28, 2023

(51) Int. Cl.
G06F 16/90    (2019.01)
G06F 16/28    (2019.01)
G06F 16/9035  (2019.01)

(52) U.S. Cl.
CPC .......... *G06F 16/9035* (2019.01); *G06F 16/28* (2019.01)

(58) Field of Classification Search
None
See application file for complete search history.

(56) References Cited

U.S. PATENT DOCUMENTS 10,445,062 B2  10/2019  Oberbreckling et al.
10,650,000 B2  5/2020   Oberbreckling et al.
2015/0310051 A1*  10/2015  An .................. G06F 16/951
                                                           707/738
2017/0371949 A1  12/2017  Le Biannic
2020/0320073 A1  10/2020  Horn

FOREIGN PATENT DOCUMENTS

CN    101676899 A    3/2010
KR    20180095652 A  8/2018

OTHER PUBLICATIONS

Ziawasch Abedjan; Profiling relational data: a survey; The VLDB Journal (2015) 24:557-581; pp. 1-25 (Year: 2015).*
Arvid Heise; Scalable Discovery of Unique Column Combinations;2014; Proceedings of the VLDB Endowment, vol. 7, No. 4; pp. 301-312 (Year: 2014).*

* cited by examiner

*Primary Examiner* — Albert M Phillips, III
*Assistant Examiner* — Jermaine A Mincey
(74) *Attorney, Agent, or Firm* — FINNEGAN, HENDERSON, FARABOW, GARRETT & DUNNER LLP

(57) ABSTRACT

Unique key fields in structured data is a critical characteristic of data which plays significant role in data management. Profiling high volume of data for discovering all possible unique keys with high accuracy is a costly and time taking affair. A method and system for finding one or more unique entities in a data have been provided. The one or more unique entities obtained by this approach are complete and the response time is quick. The method is scalable to increasing volume of data and number of fields. The system is configured to perform the analysis process in multiple phases taking the less volume initially and increasing it gradually, thereby reducing the load on later phases as the unique results found with light volume phases. The method also comprises a time check mechanism after different stages if a user wants to do discovery for limited time.

12 Claims, 6 Drawing Sheets

METHOD AND SYSTEM FOR FINDING ONE OR MORE UNIQUE ENTITIES IN DATA

PRIORITY CLAIM

This U.S. patent application claims priority under 35 U.S.C. § 119 to: Indian Patent Application No. 202221017195, filed on 25 Mar. 2022. The entire contents of the aforementioned application are incorporated herein by reference.

TECHNICAL FIELD

The disclosure herein generally relates to the field of data analysis, and, more particularly, to a method and system for finding one or more unique entities in a data, especially in a large amount of data.

BACKGROUND

Data plays crucial role in business decision making. Trustworthiness of data is very much essential towards that and hence discovering the data characteristics, understanding data is the need of the hour. Data profiling helps to discover various characteristics of data. Unique key fields or unique entities in structured data is one such critical characteristic of data which plays significant role in data management.

Many times, business applications define the unique keys as part of the metadata definitions. The unique entities definitions are also coded in application logics sometimes for convenience. Data profiling is unavoidable to discover and/or validate these definitions. Additionally, data volumes keep growing exponentially. Profiling huge volumes of data to discover all possible unique keys with high accuracy is a costly and time consuming affair for intuitive reasons. There is also high demand for near zero time for data enabling operations.

SUMMARY

Embodiments of the present disclosure present technological improvements as solutions to one or more of the above-mentioned technical problems recognized by the inventors in conventional systems. For example, in one embodiment, a system for finding one or more unique entities in a data is provided. The system comprises an input/output interface, one or more hardware processors, and a memory. The input/output interface configured to: provide the data to be analyzed as an input, wherein the data comprises a plurality of tables having a plurality of rows and a plurality of columns, provide a set of conditions for the analysis, wherein the set of conditions comprises: a percentage of rows out of the plurality of rows to be analyzed, a predefined time duration, and one of a quick approach or a rigorous approach for analysis. a memory is in communication with the one or more hardware processors, wherein the one or more first hardware processors are configured to execute programmed instructions stored in the memory, to: concatenate each of the plurality of columns to form an entity, to find distinct number of rows formed by the entity; check if the concatenated plurality of columns is unique; create a plurality of vertical partitions of the plurality of columns, if the checked concatenated plurality of columns is unique; analyze each of the plurality of vertical partitions individually using a unique column finding unit, wherein the unique column finding unit is utilizing six analysis techniques performed in a predefined sequential order, wherein the predefined sequential order of the six analysis techniques is a first light weight analysis, a second light weight analysis, a first heavy weight analysis, a second heavy weight analysis, a first cross partition analysis, and a second cross partition analysis, wherein the analysis utilizing the analysis technique comprises: (i) creating an order set from the plurality of columns by forming a plurality of combinations of $nC_{(n-1)}$ number combinations, wherein 'n' is the number of columns in the plurality of columns, (ii) validating the uniqueness of each of the plurality of combinations, wherein the validation results in the identification of one or more of unique entities or non-unique entities, (iii) selecting a first combination out of the plurality of combinations to further break down, if all of the plurality of combinations is identified as unique entities during validation, (iv) comparing a non-unique entity with all the unique entities to identify the unique column, if a non-unique entity is identified during validation, (v) removing the identified unique column from the order set to create a new order set, and (vi) iteratively performing the steps (i) to (v) for the new order set until the validation results in identification of all non-unique entities, wherein analysis results in identification of one or more unique columns; form a plurality of cross partitions using the one or more unique columns identified through analysis; validate the formed plurality of cross partitions using the percentage of rows out of the plurality of rows to be analyzed; perform a time check after every analysis technique to compare a current time taken for analysis with the predefined time duration; stop the analysis if the current time taken exceeds the predefined time duration; and provide the one or more unique columns identified before the current time taken exceeds the predefined time duration as an output.

In another aspect, a method for finding one or more unique entities in a data is provided. Initially, the data to be analyzed is provided as an input, wherein the data comprises a plurality of tables having a plurality of rows and a plurality of columns. A set of conditions is also provided for the analysis, wherein the set of conditions comprises: a percentage of rows out of the plurality of rows to be analyzed, a predefined time duration, and one of a quick approach or a rigorous approach for analysis. Further, each of the plurality of columns are then concatenated to form an entity, to find distinct number of rows formed by the entity. In the next step, it is checked if the concatenated plurality of columns is unique. Further, a plurality of vertical partitions of the plurality of columns is created, if the checked concatenated plurality of columns is unique. In the next step, each of the plurality of vertical partitions are analyzed individually using a unique column finding unit. The unique column finding unit is utilizing six analysis techniques performed in a predefined sequential order, wherein the predefined sequential order of the six analysis techniques is a first light weight analysis, a second light weight analysis, a first heavy weight analysis, a second heavy weight analysis, a first cross partition analysis, and a second cross partition analysis, wherein the analysis utilizing the analysis technique comprises: (i) creating an order set from the plurality of columns by forming a plurality of combinations of $nC_{(n-1)}$ number combinations, wherein 'n' is the number of columns in the plurality of columns, (ii) validating the uniqueness of each of the plurality of combinations, wherein the validation results in the identification of one or more of unique entities or non-unique entities, (iii) selecting a first combination out of the plurality of combinations to further break down, if all of the plurality of combinations is identified as unique entities during validation, (iv) comparing a non-unique entity with all the unique entities to identify the unique column, if a non-unique entity is identified during validation, (v) removing the identified unique column from the order set to create a new order set, and (vi) iteratively performing the steps (i) to (v) for the new order set until the validation results in identification of all non-unique entities, wherein analysis results in identification of one or more unique columns. In the next step, a plurality of cross partitions is formed using the one or more unique columns identified through analysis. The formed plurality of cross partitions is then validated using the percentage of rows out of the plurality of rows to be analyzed. A time check is also performed after every analysis technique to compare a current time taken for analysis with the predefined time duration. Further, the analysis is stopped if the current time taken exceeds the predefined time duration. Finally, the one or more unique columns identified before the current time taken exceeds the predefined time duration are provided as an output.

In yet another aspect, one or more non-transitory machine-readable information storage mediums comprising one or more instructions which when executed by one or more hardware processors cause finding one or more unique entities in a data is provided. Initially, the data to be analyzed is provided as an input, wherein the data comprises a plurality of tables having a plurality of rows and a plurality of columns. A set of conditions is also provided for the analysis, wherein the set of conditions comprises: a percentage of rows out of the plurality of rows to be analyzed, a predefined time duration, and one of a quick approach or a rigorous approach for analysis. Further, each of the plurality of columns are then concatenated to form an entity, to find distinct number of rows formed by the entity. In the next step, it is checked if the concatenated plurality of columns is unique. Further, a plurality of vertical partitions of the plurality of columns is created, if the checked concatenated plurality of columns is unique. In the next step, each of the plurality of vertical partitions are analyzed individually using a unique column finding unit. The unique column finding unit is utilizing six analysis techniques performed in a predefined sequential order, wherein the predefined sequential order of the six analysis techniques is a first light weight analysis, a second light weight analysis, a first heavy weight analysis, a second heavy weight analysis, a first cross partition analysis, and a second cross partition analysis, wherein the analysis utilizing the analysis technique comprises: (i) creating an order set from the plurality of columns by forming a plurality of combinations of $nC_{(n-1)}$ number combinations, wherein 'n' is the number of columns in the plurality of columns, (ii) validating the uniqueness of each of the plurality of combinations, wherein the validation results in the identification of one or more of unique entities or non-unique entities, (iii) selecting a first combination out of the plurality of combinations to further break down, if all of the plurality of combinations is identified as unique entities during validation, (iv) comparing a non-unique entity with all the unique entities to identify the unique column, if a non-unique entity is identified during validation, (v) removing the identified unique column from the order set to create a new order set, and (vi) iteratively performing the steps (i) to (v) for the new order set until the validation results in identification of all non-unique entities, wherein analysis results in identification of one or more unique columns. In the next step, a plurality of cross partitions is formed using the one or more unique columns identified through analysis. The formed plurality of cross partitions is then validated using the percentage of rows out of the plurality of rows to be analyzed. A time check is also performed after every analysis technique to compare a current time taken for analysis with the predefined time duration. Further, the analysis is stopped if the current time taken exceeds the predefined time duration. Finally, the one or more unique columns identified before the current time taken exceeds the predefined time duration are provided as an output.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
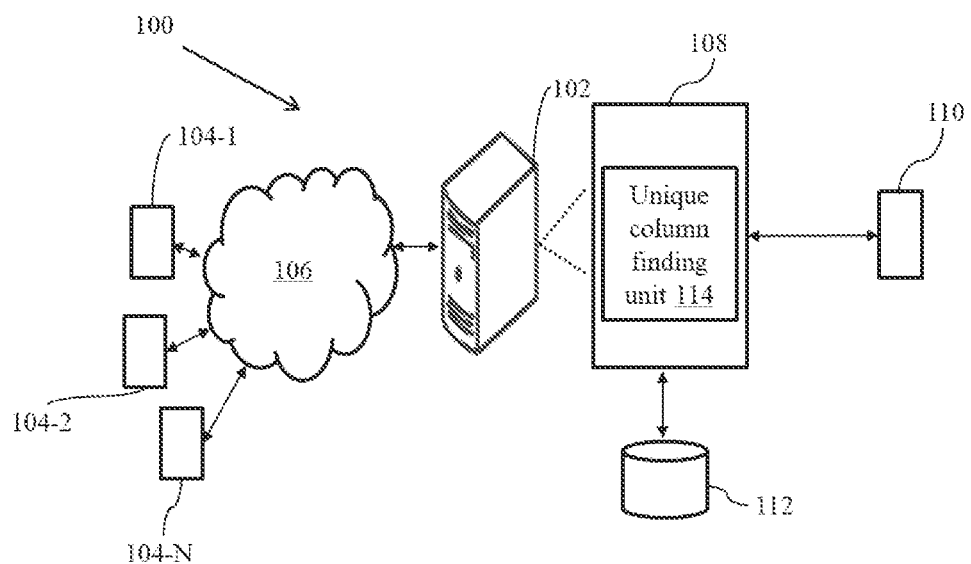
FIG. 1 illustrates a block diagram of a system for finding one or more unique entities in a data according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Identifying unique key fields or unique entities in large amount data is a critical characteristic of data which plays significant role in data management. Discovering unique entities in a huge amount of data is a solved problem in the prior art. However, time taken to deliver the result depends on volume of data processed (number of rows) and number of fields analyzed (number of columns). When there is an increase in either or both of the mentioned factors, the time taken to fetch results is also more. Moreover, the result obtained is expected to be complete. For a given set of input data, when all possible unique combinations are captured, the result is complete. Results should also be consistent every time for a given set of input data.

According to an embodiment of the disclosure, a method and system have been provided for finding one or more unique entities in a data. The method is enabled to find one or more unique entities in the huge amount of data efficiently in lesser time as compared to prior methods. The one or more unique entities obtained by this approach are complete and the response time is quick. The method is scalable to increasing volume of data and number of fields. The system is configured to perform the analysis process in multiple phases taking less volume initially and increasing it gradually, thereby reducing the load on later phases. The method also comprises a time check mechanism after different stages if a user wants to do discovery for limited time. The method also includes two different modes of analysis— surface and in-depth.

Referring now to the drawings, and more particularly to FIG. 1 through FIG. 4C, where similar reference characters denote corresponding features consistently throughout the figures, there are shown preferred embodiments and these embodiments are described in the context of the following exemplary system and/or method.

According to an embodiment of the disclosure, FIG. 1 illustrates a block diagram of a system 100 for finding one or more unique entities in a data. The system 100 is utilizing dynamic partitioning to quickly find the composite unique entities or unique keys spread across an input table which reduces the time of further analysis. The time based discovery is used to find possible keys or entities within given time limit per table. The system 100 is using a top-down approach to quickly converge the area of analysis. In the top-down approach, a large amount of data is initially taken as input. This large amount of data then filtered down to reduce in quantity for searching the one or more unique entities. The system 100 is also configured to use light SQL queries as compared to heavy queries fetching millions of data, thereby reducing the load on relational database management system (RDBMS). Use of unique and non-unique combinations to remove the garbage helps in reducing time of analysis and reduces the load on high volume analysis phase. The garbage here refers to the data in which there is no possibility of finding one or more unique keys.

It may be understood that the system 100 comprises one or more computing devices 102, such as a laptop computer, a desktop computer, a notebook, a workstation, a cloud-based computing environment and the like. It will be understood that the system 100 may be accessed through one or more input/output interfaces 104, collectively referred to as I/O interface 104 or user interface 104. Examples of the I/O interface 104 may include, but are not limited to, a user interface, a portable computer, a personal digital assistant, a handheld device, a smartphone, a tablet computer, a workstation and the like. The I/O interface 104 are communicatively coupled to the system 100 through a network 106.

In an embodiment, the network 106 may be a wireless or a wired network, or a combination thereof. In an example, the network 106 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 106 may include a variety of network devices, including routers, bridges, servers, computing devices, storage devices. The network devices within the network 106 may interact with the system 100 through communication links.

The system 100 may be implemented in a workstation, a mainframe computer, a server, and a network server. In an embodiment, the computing device 102 further comprises one or more hardware processors 108, one or more memory 110, hereinafter referred as a memory 110 and a data repository 112, for example, a repository 112. The memory 110 is in communication with the one or more hardware processors 108, wherein the one or more hardware processors 108 are configured to execute programmed instructions stored in the memory 110, to perform various functions as explained in the later part of the disclosure. The repository 112 may store data processed, received, and generated by the system 100. The memory 110 further comprises a plurality of units for performing various functions. The plurality of units comprises a unique column finding unit 114.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

Figure 2:
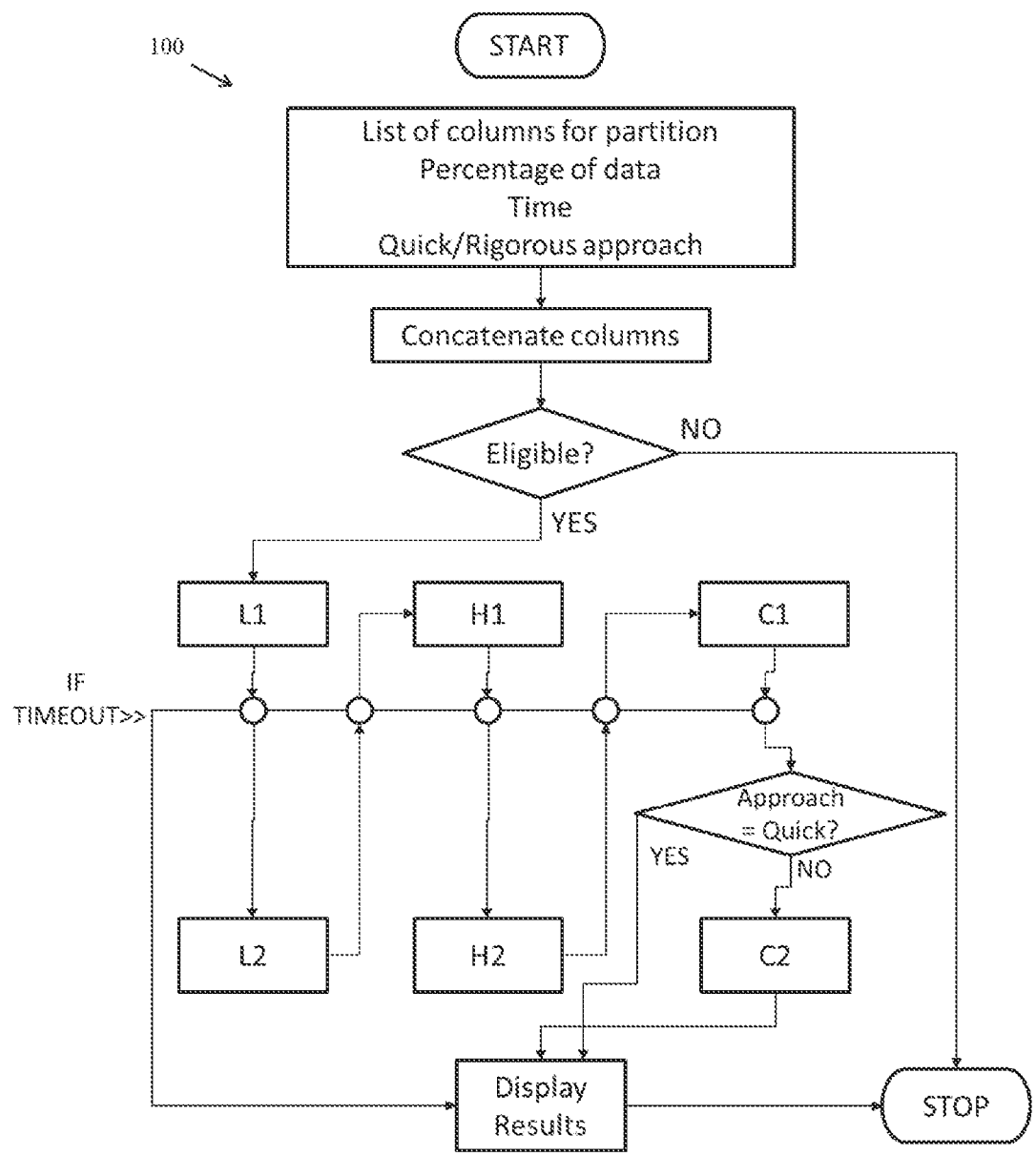
FIG. 2 is a schematic diagram of the system of FIG. 1 for finding one or more unique entities in the data according to some embodiments of the present disclosure.

According to an embodiment of the disclosure, a functional block diagram of the system 100 finding one or more unique entities in the data is shown in FIG. 2. The system 100 is configured to receive the input data and a set of conditions as an input via the user interface 104. The input data is normally comprising a plurality of tables having a plurality of rows and a plurality of columns. The set of conditions provided for the analysis so that one or more unique entities can be identified from the input data. The set of conditions comprises: a percentage of rows out of the plurality of rows to be analyzed, a predefined time duration in minutes, and one of a quick approach or a rigorous approach for analysis. The set of conditions are chosen by the user based on the requirements. The quick approach is used for quick analysis of the input data, while the rigorous approach is used for detailed analysis of the input data and taking more time as compared to the quick approach.

The plurality of columns is concatenated to find a distinct number of rows formed by the entity. This operation is performed using light SQL query which considers few rows of the table to derive results. If concatenated entity is found as unique, analysis proceeds further to create vertical partitions of columns. Each partition is analyzed individually by the unique column finding unit 114.

According to an embodiment of the disclosure, the system 100 is configured to analyze the input data using six analysis techniques in a predefined sequential manner. The six analysis techniques are chosen as per logical complexity and time complexity. The analysis technique is performed in the unique column finding unit 114. The six analysis techniques are a first light weight analysis (L1), followed by a second light weight analysis (L2), followed by a first heavy weight analysis (H1), followed by a second heavy weight analysis (H2), followed by a first cross partition analysis (C1), and finally a second cross partition analysis (C2). Initial two analysis techniques are light weighted as analysis is done on few amounts of data. On the surface, unique entities found in these two analysis techniques give quick start for further analysis techniques. Non-unique combinations found in previous analysis techniques are stored in memory and new combinations of current phase are compared with them to remove garbage combinations. This reduces the time complexity for next high volume analysis techniques.

The six analysis techniques are preferred in the predefined sequential order. The first light weight analysis is performed on the concatenated plurality of columns and displaying the result of the first light weight analysis if the current time duration is more than the predefined time duration. The predefined time duration is chosen by the user. The predefined time duration is selected by the user to perform the time based analysis of the data. The second light weight analysis is performed on the output of the first light weight analysis if the current time duration is less than the predefined time duration and displaying the result of the second light weight analysis if the current time duration is more than the predefined time duration. The initial two phases find the easy keys earlier without applying more load on the RDBMS. That will help for further analysis and give the edge on time. Non-unique combinations found in previous phases are stored in the memory 110 and new combinations of current phase are compared with them to remove garbage combinations. At the end of all the phases or end of time limit, results up to that point are given as an output.

The first heavy weight analysis is performed on the output of the second light weight analysis if the current time duration is less than the predefined time duration and displaying the result of the first heavy weight analysis if the current time duration is more than the predefined time duration. The second heavy weight analysis is performed on the output of first heavy weight analysis if the current time duration is less than the predefined time duration and displaying the result of the second heavy weight analysis if the current time duration is more than the predefined time duration. The first cross partition analysis is performed on the output of the second heavy weight analysis if the current time duration is less than the predefined time duration and displaying the result of the first cross partition analysis if the current time duration is more than the predefined time duration. The second cross partition analysis is performed on the output of the first cross partition analysis if the current time duration is less than the predefined time duration and displaying the result of the second cross partition analysis.

In an example, the first light weight analysis is set to first 1000 rows, with partition threshold is set as 10. The second light weight analysis is set of first 1000 rows, with partition threshold is set as 15. The initial two phases find the easy keys earlier without applying more load on RDBMS. For the first heavy weight analysis the number of rows is set by the user, with partition threshold is set as 20. For the second heavy weight analysis, the number of rows is set by the user, with two partitions are made as number of columns divided by 2. For the first cross partition analysis the number of rows is set by the user, and analysis is done for all columns, in which the analysis is not exhaustive. For the second cross partition analysis, the number of rows is set by the user, and analysis is done for all columns and the analysis is exhaustive.

Figure 3:
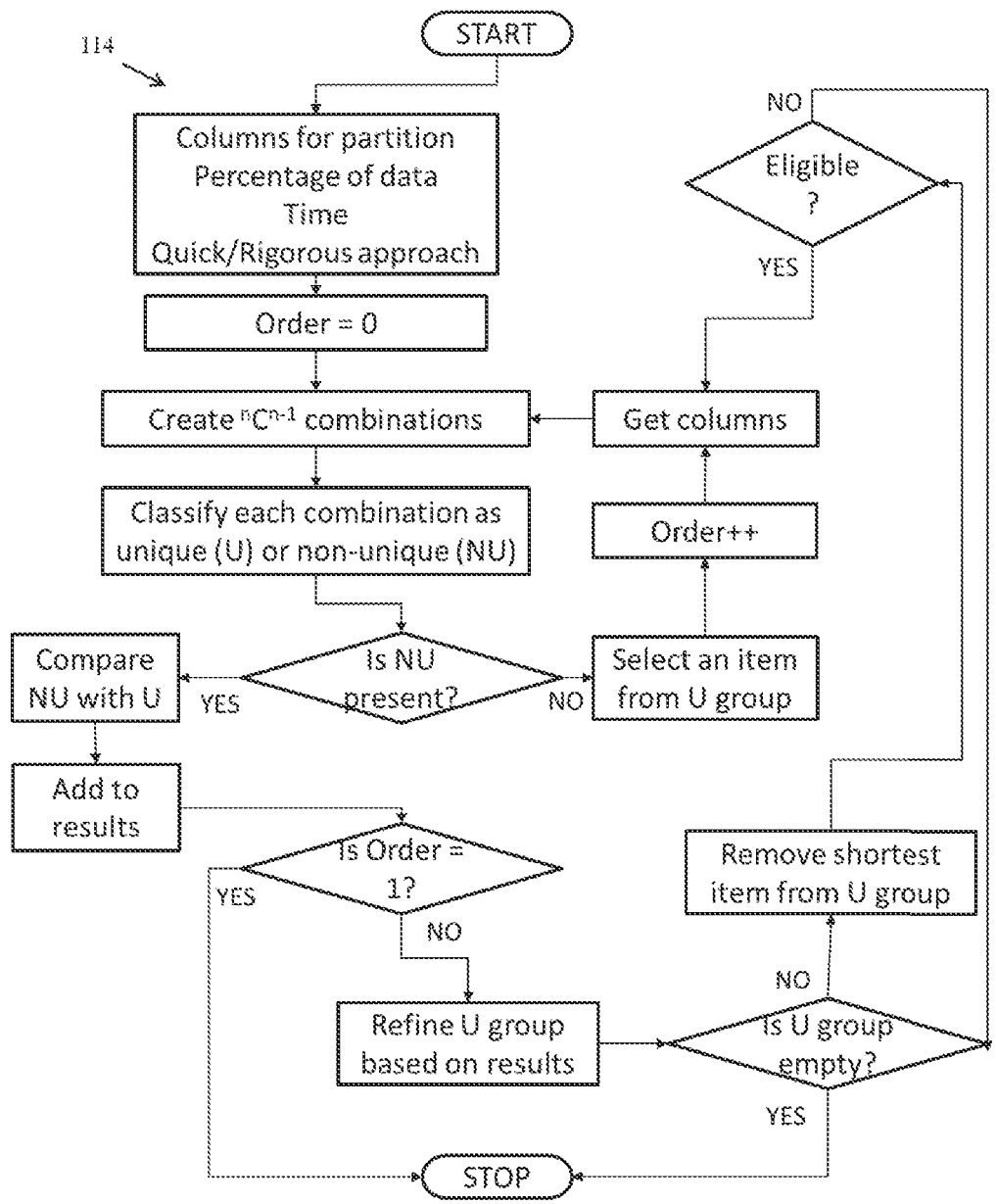
FIG. 3 is a flowchart illustrating the steps involved in a unique column finding unit according to some embodiments of the present disclosure.

According to an embodiment of the disclosure, a flowchart illustrating the steps involved in the execution of the unique column finding unit 114 is shown in FIG. 3. Initially the set of conditions is provided as the input and the order is set as zero. Further an order set is created from the plurality of columns by forming a plurality of combinations of $nC_{(n-1)}$ number of combinations, wherein 'n' is the number of columns in the plurality of columns. In the next step, the uniqueness of each of the plurality of combinations is validated or checked, in which the validation results in the identification of one or more of unique entities or non-unique entities. In the next step, it is checked whether there is any non-unique entity present. If the non-unique entities are not present, then an item is selected from the unique group and order is increased by one and again $nC_{(n-1)}$ combinations are created. If the non-unique entities are present, then non-unique entities are compared with each of the unique entities. The result of the comparison is one or more unique columns which is added to a final output list.

In the next step, it is checked if the order is equal to one. If the order is equal one, then the process is stopped. If not, then the group is refined based on the result of comparison. Further, it is checked if the unique entity group is empty. If yes, then the process is stopped. If no, then the shortest item from the unique group is removed. Further it is checked, whether the unique group is eligible for further analysis. If yes, then once again $nC_{(n-1)}$ combinations are created. And the whole process is repeated for new created plurality of combinations.

According to an embodiment of the disclosure, the system 100 can be extended for different relational database management system (RDBMS) vendors by adding corresponding SQL queries. Non-unique combinations found in previous phases are stored in memory and new combinations of current phase are compared with them to remove garbage combinations. This will reduce the time complexity for next high volume phases.

Figure 4A:
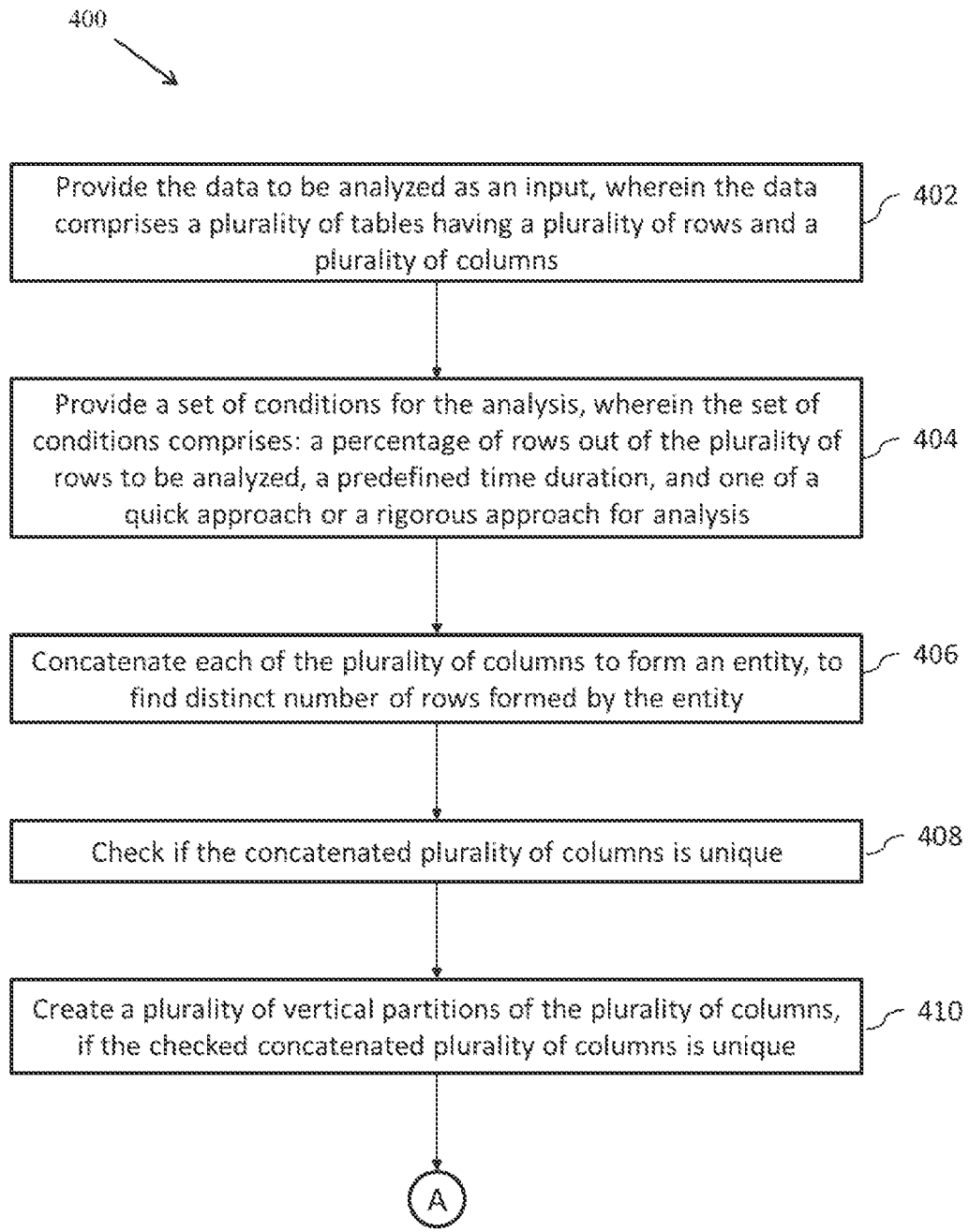
FIG. 4A-4C is a flowchart of a method for finding one or more unique entities in a data according to some embodiments of the present disclosure
Figure 4B:
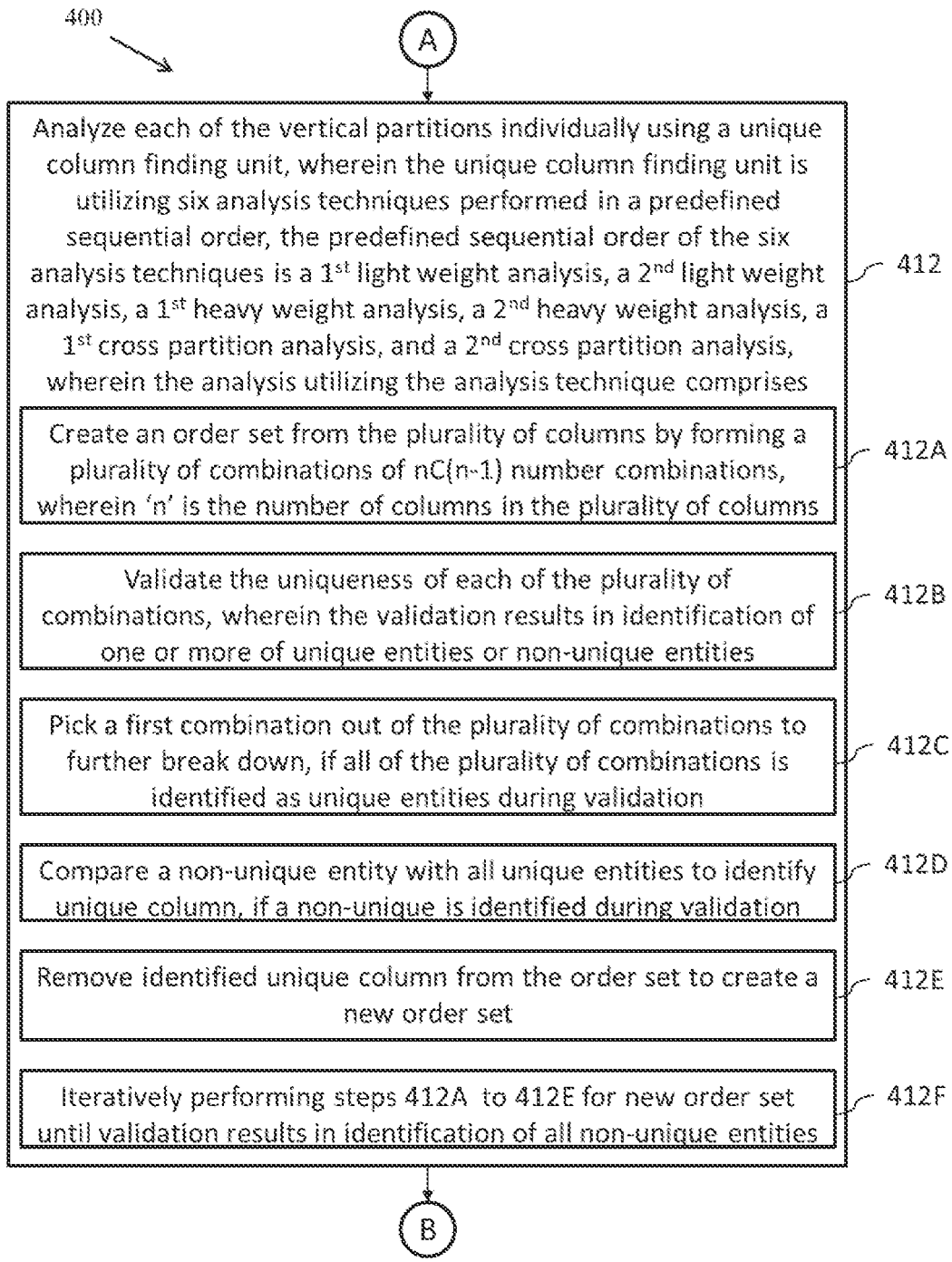
Figure 4C:
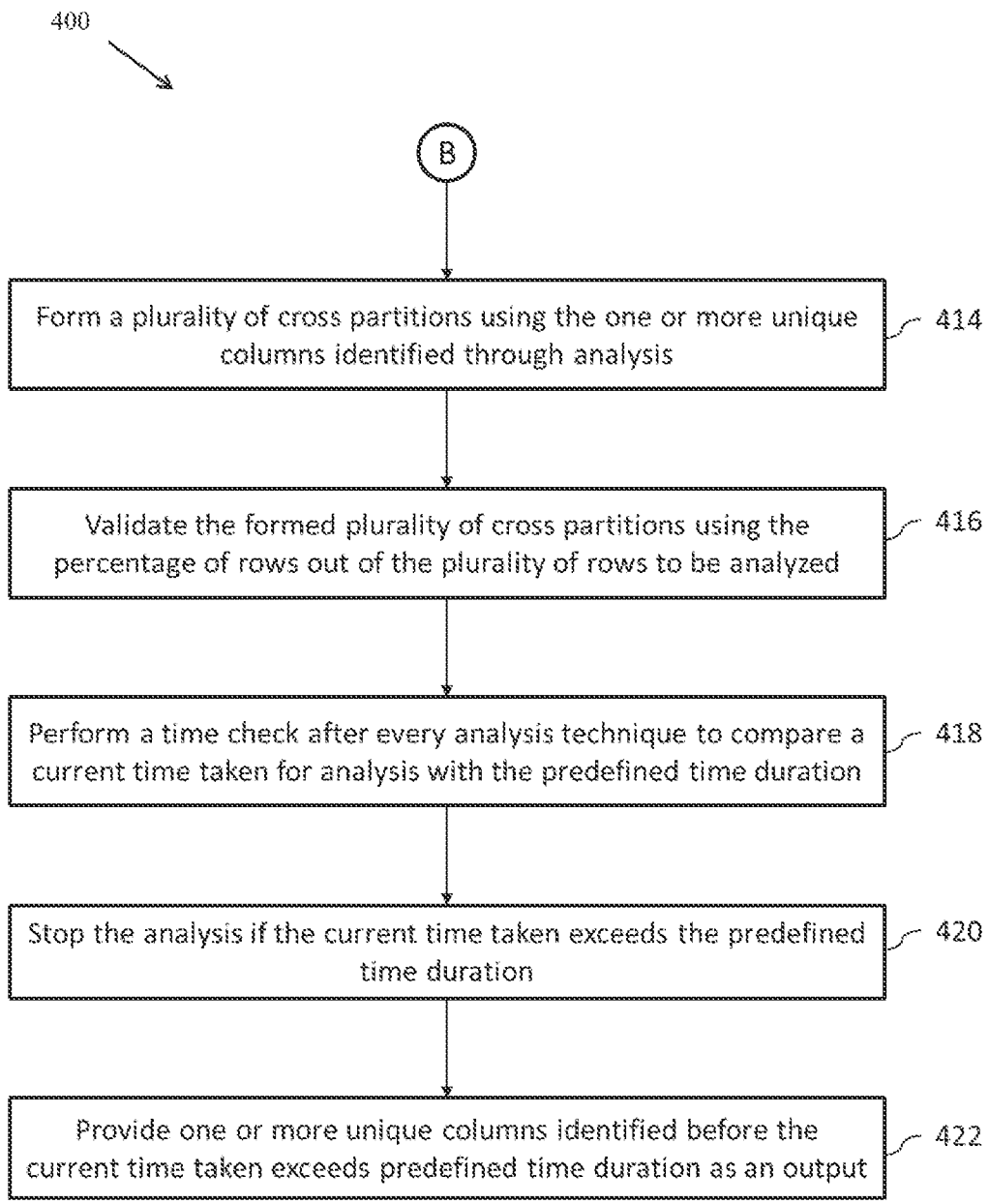

FIG. 4A-4C illustrates an example flow chart of a method 400 for finding one or more unique entities in a data, in accordance with an example embodiment of the present disclosure. The method 400 depicted in the flow chart may be executed by a system, for example, the system 100 of FIG. 1. In an example embodiment, the system 100 may be embodied in the computing device.

Operations of the flowchart, and combinations of operations in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 400 are described with help of system 100. However, the operations of the method 400 can be described and/or practiced by using any other system.

Initially at step 402 of the method 400, the data to be analyzed is provided as an input. The data is provided in the form of a plurality of tables. The plurality of tables having a plurality of rows and a plurality of columns. Further at step 404, a set of conditions is also provided for the analysis. The set of conditions comprises: a percentage of rows out of the plurality of rows to be analyzed, a predefined time duration, and one of a quick approach or a rigorous approach for analysis.

At step 406 of the method 400, each of the plurality of columns are concatenated to form an entity, to find distinct number of rows formed by the entity. Further at step 408, it is checked if the concatenated plurality of columns is unique. In the next step 410, a plurality of vertical partitions of the plurality of columns is created, if the checked concatenated plurality of columns is unique.

At step 412 of the method 400, each of the plurality of vertical partitions are analyzed individually using the unique column finding unit 114. The unique column finding unit 114 is utilizing six analysis techniques performed in a predefined sequential order. The predefined sequential order of the six analysis techniques is a first light weight analysis, followed by a second light weight analysis, followed by a first heavy weight analysis, followed by a second heavy weight analysis, followed by a first cross partition analysis, and finally a second cross partition analysis.

The analysis at step 412 utilizes the analysis technique, further comprises a set of steps for each of the analysis technique. Initially at step 412A, an order set is created from the plurality of columns by forming a plurality of combinations of $nC_{(n-1)}$ number combinations, wherein 'n' is the number of columns in the plurality of columns. At step 412B, the uniqueness of each of the plurality of combinations is validated or checked. The validation results in the identification of one or more of unique entities or non-unique entities. There could be three possibilities of the validation. Firstly, all the checked plurality of combinations is identified as unique entities. Secondly, one or more of the combinations if non-unique and rest other combinations are identified as unique entities. And thirdly, all the checked plurality of combinations is identified as non-unique entities. At step 412C, if all of the plurality of combinations is identified as unique entities during validation then a first combination is selected out of the plurality of combinations for further break down. At step 412D, if a non-unique entity is identified during validation then, the non-unique entity is compared with all the unique entities to identify the unique column. In the next step 412E, the identified unique column is removed from the order set to create a new order set. And finally, the steps 412A to 412E are performed iteratively for the new order set until the validation results in identification of all non-unique entities. The analysis results in identification of one or more unique columns as an output.

Further at step 414 of the method 400, a plurality of cross partitions is formed using the one or more unique columns identified through analysis. At step 416, the formed plurality of cross partitions is validated using the percentage of rows out of the plurality of rows to be analyzed, which were provided as the input. At step 418, a time check is also performed after every analysis technique to compare a current time taken for analysis with the predefined time duration. At step 420, the analysis is stopped if the current time taken exceeds the predefined time duration. Finally, at step 422, the one or more unique columns identified before the current time taken exceeds the predefined time duration are provided as the final output.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of time taken to deliver the result and capturing all possible unique combinations with consistency. The embodiment thus provides a method and a system for finding one or more unique entities in a data.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for finding unique entities or unique keys in a data, the method comprising:
providing, via an input/output interface, the data to be analyzed as an input, wherein the data comprises a plurality of tables having a plurality of rows and a plurality of columns, wherein the unique entities or the unique keys are spread across the plurality of tables, and wherein a time based discovery is used to find the unique entities or the unique keys within a time limit per table of the plurality of tables and a top-down approach is used to perform analysis of the data;
providing, via the input/output interface, a set of conditions for the analysis, wherein the set of conditions comprises:
a percentage of rows out of the plurality of rows to be analyzed,
a predefined time duration, and
one of a quick approach or a rigorous approach for analysis;
concatenating, via the one or more hardware processors, each of the plurality of columns to form an entity, to find distinct number of rows formed by the entity, wherein the concatenation is performed using a light Structured query language (SQL) query which considers one or more rows of the plurality of tables to derive results;
checking, via the one or more hardware processors, if the concatenated plurality of columns is unique;
creating, via the one or more hardware processors, a plurality of vertical partitions of the plurality of columns, if the checked concatenated plurality of columns is unique;
analyzing, via the one or more hardware processors, each of the plurality of vertical partitions individually using a unique column finding unit, wherein the unique column finding unit is utilizing six analysis techniques performed in a predefined sequential order, wherein the predefined sequential order of the six analysis techniques is a first light weight analysis is a set for a first predefined number of rows with a first partition threshold, a second light weight analysis is a set for a second predefined number of rows with a second partition threshold, a first heavy weight analysis is a set for a third predefined number of rows with a third partition threshold, a second heavy weight analysis is a set for a fourth predefined number of rows with two partitions made as number of columns divided by 2, a first cross partition analysis with a number of rows set by a user and analysis performed for all columns and non-exhaustive analysis, and a second cross partition analysis with a number of rows set by a user and analysis performed for all columns and exhaustive analysis, wherein the first light weight analysis and the second light weight analysis are performed initially to reduce load on relational database management system (RDBMS), and wherein the analysis utilizing the analysis technique comprises:
(i) creating an order set of columns from the plurality of columns by forming a plurality of column combinations of $nC_{(n-1)}$ number combinations, wherein 'n' is the number of columns in the plurality of columns and n-1 is number of columns subtracted by 1,
(ii) checking the uniqueness of each of the plurality of column combinations, wherein the validation results in the identification of one or more of unique entities or non-unique entities,
(iii) selecting a first combination out of the plurality of column combinations to break down the plurality of column combinations by reducing the value of 'n' by 1, if all of the plurality of column combinations is identified as unique entities during validation,
(iv) comparing a non-unique entity in the plurality of column combinations with all the unique entities in the plurality of column combinations to identify the unique column, if a non-unique entity is identified during validation,
(v) removing the identified unique column from the order set to create a new order set, and
(vi) iteratively performing the steps (i) to (v) for the new order set until the validation results in identification of all non-unique entities, wherein analysis results in identification of one or more unique columns;
forming, via the one or more hardware processors, a plurality of cross partitions using the one or more unique columns identified through analysis;
validating, via the one or more hardware processors, the formed plurality of cross partitions using the percentage of rows out of the plurality of rows to be analyzed;
performing, via the one or more hardware processors, a time check after every analysis technique to compare a current time taken for analysis with the predefined time duration;
stopping, via the one or more hardware processors, the analysis if the current time taken exceeds the predefined time duration; and
providing, via the one or more hardware processors, the one or more unique columns identified before the current time taken exceeds the predefined time duration as an output.

2. The method of claim 1, further comprising storing non-unique combinations in a memory.

3. The method of claim 1, further comprising comparing the plurality of column combinations of the new order set with the plurality of column combinations of the order set of columns to remove garbage combinations.

4. A system for finding unique entities or unique keys in a data, the system comprises:
an input/output interface configured to:
provide the data to be analyzed as an input, wherein the data comprises a plurality of tables having a plurality of rows and a plurality of columns, wherein the unique entities or the unique keys are spread across the plurality of tables, and wherein a time based discovery is used to find the unique entities or the unique keys within a time limit per table of the plurality of tables and a top-down approach is used to perform analysis of the data,
provide a set of conditions for the analysis, wherein the set of conditions comprises: a percentage of rows out of the plurality of rows to be analyzed, a predefined time duration, and one of a quick approach or a rigorous approach for analysis;
one or more hardware processors; and
a memory in communication with the one or more hardware processors, wherein the one or more hardware processors are configured to execute programmed instructions stored in the memory, to:

concatenate each of the plurality of columns to form an entity, to find distinct number of rows formed by the entity, wherein the concatenation is performed using a light Structured query language (SQL) query which considers one or more rows of the plurality of tables to derive results;

check if the concatenated plurality of columns is unique;

create a plurality of vertical partitions of the plurality of columns, if the checked concatenated plurality of columns is unique;

analyze each of the plurality of vertical partitions individually using a unique column finding unit, wherein the unique column finding unit is utilizing six analysis techniques performed in a predefined sequential order, wherein the predefined sequential order of the six analysis techniques is a first light weight analysis is a set for a first predefined number of rows with a first partition threshold, a second light weight analysis is a set for a second predefined number of rows with a second partition threshold, a first heavy weight analysis is a set for a third predefined number of rows with a third partition threshold, a second heavy weight analysis is a set for a fourth predefined number of rows with two partitions made as number of columns divided by 2, a first cross partition analysis with a number of rows set by a user and analysis performed for all columns and non-exhaustive analysis, and a second cross partition analysis with a number of rows set by a user and analysis performed for all columns and exhaustive analysis, wherein the first light weight analysis and the second light weight analysis are performed initially to reduce load on relational database management system (RDBMS), and wherein the analysis utilizing the analysis technique comprises:
  (i) creating an order set of columns from the plurality of columns by forming a plurality of column combinations of $nC_{(n-1)}$ number combinations, wherein 'n' is the number of columns in the plurality of columns and n-1 is number of columns subtracted by 1,
  (ii) checking the uniqueness of each of the plurality of column combinations, wherein the validation results in the identification of one or more of unique entities or non-unique entities,
  (iii) selecting a first combination out of the plurality of column combinations to break down the plurality of column combinations by reducing the value of 'n' by 1, if all of the plurality of column combinations is identified as unique entities during validation,
  (iv) comparing a non-unique entity in the plurality of column combinations with all the unique entities in the plurality of column combinations to identify the unique column, if a non-unique entity is identified during validation,
  (v) removing the identified unique column from the order set to create a new order set, and
  (vi) iteratively performing the steps (i) to (v) for the new order set until the validation results in identification of all non-unique entities, wherein analysis results in identification of one or more unique columns;

form a plurality of cross partitions using the one or more unique columns identified through analysis;

validate the formed plurality of cross partitions using the percentage of rows out of the plurality of rows to be analyzed;

perform a time check after every analysis technique to compare a current time taken for analysis with the predefined time duration;

stop the analysis if the current time taken exceeds the predefined time duration; and provide the one or more unique columns identified before the current time taken exceeds the predefined time duration as an output.

5. The system of claim 4, further configured to:
perform the first light weight analysis on the concatenated plurality of columns, and displaying the result of the first light weight analysis if the current time duration is more than the predefined time duration;

perform the second light weight analysis on the output of the first light weight analysis if the current time duration is less than the predefined time duration, and displaying the result of the second light weight analysis if the current time duration is more than the predefined time duration;

perform the first heavy weight analysis on the output of the second light weight analysis if the current time duration is less than the predefined time duration, and displaying the result of the first heavy weight analysis if the current time duration is more than the predefined time duration;

perform the second heavy weight analysis on the output of first heavy weight analysis if the current time duration is less than the predefined time duration, and displaying the result of the second heavy weight analysis if the current time duration is more than the predefined time duration;

perform the first cross partition analysis on the output of the second heavy weight analysis if the current time duration is less than the predefined time duration, and displaying the result of the first cross partition analysis if the current time duration is more than the predefined time duration; and perform the second cross partition analysis on the output of the first cross partition analysis if the current time duration is less than the predefined time duration and displaying the result of the second cross partition analysis.

6. The system of claim 4, further configured to store non-unique combinations in the memory.

7. The system of claim 4, further configured to compare the plurality of column combinations of the new order set with the plurality of column combinations of the order set of columns to remove garbage combinations.

8. One or more non-transitory machine-readable information storage mediums comprising one or more instructions for finding unique entities or unique keys in a data, the instructions which when executed by one or more hardware processors cause:
providing, via an input/output interface, the data to be analyzed as an input, wherein the data comprises a plurality of tables having a plurality of rows and a plurality of columns, wherein the unique entities or the unique keys are spread across the plurality of tables, and wherein a time based discovery is used to find the unique entities or the unique keys within a time limit per table of the plurality of tables and a top-down approach is used to perform analysis of the data;

providing, via the input/output interface, a set of conditions for the analysis, wherein the set of conditions comprises:
  a percentage of rows out of the plurality of rows to be analyzed,
  a predefined time duration, and
  one of a quick approach or a rigorous approach for analysis;
concatenating each of the plurality of columns to form an entity, to find distinct number of rows formed by the entity, wherein the concatenation is performed using a light Structured query language (SQL) query which considers one or more rows of the plurality of tables to derive results;
checking if the concatenated plurality of columns is unique;
creating a plurality of vertical partitions of the plurality of columns, if the checked concatenated plurality of columns is unique;
analyzing each of the plurality of vertical partitions individually using a unique column finding unit, wherein the unique column finding unit is utilizing six analysis techniques performed in a predefined sequential order, wherein the predefined sequential order of the six analysis techniques is a first light weight analysis is a set for a first predefined number of rows with a first partition threshold, a second light weight analysis is a set for a second predefined number of rows with a second partition threshold, a first heavy weight analysis is a set for a third predefined number of rows with a third partition threshold, a second heavy weight analysis is a set for a fourth predefined number of rows with two partitions made as number of columns divided by 2, a first cross partition analysis with a number of rows set by a user and analysis performed for all columns and non-exhaustive analysis, and a second cross partition analysis with a number of rows set by a user and analysis performed for all columns and exhaustive analysis, wherein the first light weight analysis and the second light weight analysis are performed initially to reduce load on relational database management system (RDBMS), and wherein the analysis utilizing the analysis technique comprises:
  (i) creating an order set of columns from the plurality of columns by forming a plurality of column combinations of $nC_{(n-1)}$ number combinations, wherein 'n' is the number of columns in the plurality of columns and n-1 is number of columns subtracted by 1,
  (ii) checking the uniqueness of each of the plurality of column combinations, wherein the validation results in the identification of one or more of unique entities or non-unique entities,
  (iii) selecting a first combination out of the plurality of column combinations to break down the plurality of column combinations by reducing the value of 'n' by 1, if all of the plurality of column combinations is identified as unique entities during validation,
  (iv) comparing a non-unique entity in the plurality of column combinations with all the unique entities in the plurality of column combinations to identify the unique column, if a non-unique entity is identified during validation,
  (v) removing the identified unique column from the order set to create a new order set, and
  (vi) iteratively performing the steps (i) to (v) for the new order set until the validation results in identification of all non-unique entities, wherein analysis results in identification of one or more unique columns;
forming a plurality of cross partitions using the one or more unique columns identified through analysis;
validating the formed plurality of cross partitions using the percentage of rows out of the plurality of rows to be analyzed;
performing a time check after every analysis technique to compare a current time taken for analysis with the predefined time duration;
stopping the analysis if the current time taken exceeds the predefined time duration; and
providing the one or more unique columns identified before the current time taken exceeds the predefined time duration as an output.

9. The one or more non-transitory machine-readable information storage mediums of claim 8, further cause:
  performing the first light weight analysis on the concatenated plurality of columns, and displaying the result of the first light weight analysis if the current time duration is more than the predefined time duration;
  performing the second light weight analysis on the output of the first light weight analysis if the current time duration is less than the predefined time duration, and displaying the result of the second light weight analysis if the current time duration is more than the predefined time duration;
  performing the first heavy weight analysis on the output of the second light weight analysis if the current time duration is less than the predefined time duration, and displaying the result of the first heavy weight analysis if the current time duration is more than the predefined time duration;
  performing the second heavy weight analysis on the output of first heavy weight analysis if the current time duration is less than the predefined time duration, and displaying the result of the second heavy weight analysis if the current time duration is more than the predefined time duration;
  performing the first cross partition analysis on the output of the second heavy weight analysis if the current time duration is less than the predefined time duration, and displaying the result of the first cross partition analysis if the current time duration is more than the predefined time duration; and
  performing the second cross partition analysis on the output of the first cross partition analysis if the current time duration is less than the predefined time duration and displaying the result of the second cross partition analysis.

10. The one or more non-transitory machine-readable information storage mediums of claim 8, further cause storing non-unique combinations in a memory.

11. The one or more non-transitory machine-readable information storage mediums of claim 8, further cause comparing the plurality of column combinations of the new order set with the plurality of column combinations of the order set of columns to remove garbage combinations.

12. The method of claim 1, further comprising:
  performing the first light weight analysis on the concatenated plurality of columns, and displaying the result of the first light weight analysis if the current time duration is more than the predefined time duration;
  performing the second light weight analysis on the output of the first light weight analysis if the current time duration is less than the predefined time duration, and displaying the result of the second light weight analysis if the current time duration is more than the predefined time duration;

performing the first heavy weight analysis on the output of the second light weight analysis if the current time duration is less than the predefined time duration, and displaying the result of the first heavy weight analysis if the current time duration is more than the predefined time duration;

performing the second heavy weight analysis on the output of first heavy weight analysis if the current time duration is less than the predefined time duration, and displaying the result of the second heavy weight analysis if the current time duration is more than the predefined time duration;

performing the first cross partition analysis on the output of the second heavy weight analysis if the current time duration is less than the predefined time duration, and displaying the result of the first cross partition analysis if the current time duration is more than the predefined time duration; and performing the second cross partition analysis on the output of the first cross partition analysis if the current time duration is less than the predefined time duration and displaying the result of the second cross partition analysis.

* * * * *